United States Patent [19]

Pfeiffer

[11] 4,258,158

[45] Mar. 24, 1981

[54] MANUFACTURE OF ETHYLENE HOMOPOLYMERS AND COPOLYMERS

[75] Inventor: Erich Pfeiffer, Wesseling, Fed. Rep. of Germany

[73] Assignee: BASF Aktiengesellschaft, Fed. Rep. of Germany

[21] Appl. No.: 930,058

[22] Filed: Aug. 1, 1978

[51] Int. Cl.$^3$ ............................................... C08F 6/10
[52] U.S. Cl. .......................................... 526/68; 526/70
[58] Field of Search ........................... 526/68, 70, 88; 528/483, 501

[56] References Cited

U.S. PATENT DOCUMENTS

| | | | |
|---|---|---|---|
| 2,943,082 | 6/1960 | Cottle | 528/501 |
| 3,184,444 | 5/1965 | Eilbracht | 526/68 |
| 3,218,729 | 11/1965 | Micklich | 34/10 |
| 3,225,021 | 12/1965 | Erchak | 526/70 |
| 3,242,150 | 3/1966 | Scoggin | 260/88.2 |

FOREIGN PATENT DOCUMENTS 853414  11/1960  United Kingdom .

*Primary Examiner*—Paul R. Michl
*Attorney, Agent, or Firm*—Keil & Witherspoon

[57] ABSTRACT

A process for the continuous manufacture of ethylene polymers by catalytic polymerization of the monomer at an elevated temperature and elevated partial pressures of ethylene in a hydrocarbon which is a solvent for the monomer but a non-solvent for the polymer formed, the polymer being isolated by (a) discharging a mixture of polymer, hydrocarbon and monomer from the polymerization chamber, (b) bringing the mixture from stage (a) to a pressure and temperature such that a gaseous phase consisting of the monomer and hydrocarbon and a solid phase consisting of the polymer, with adhering hydrocarbon, is formed, and (c) flushing the solid phase from stage (b) with an inert gas, so as to form a solid phase consisting of polymer and a gaseous phase consisting of hydrocarbon and inert gas, wherein, as additional measures (d), the gaseous phase from stage (c) is brought to a pressure and temperature such that a gaseous phase consisting of inert gas and a liquid phase consisting of hydrocarbon are formed and (e) the liquid phase from stage (d) is separated into two components by evaporating one portion, as a rule the smaller portion, and recycling the remaining portion to the polymerization chamber. The process according to the invention minimizes atmospheric pollution.

4 Claims, 4 Drawing Figures

MANUFACTURE OF ETHYLENE HOMOPOLYMERS AND COPOLYMERS

The present invention relates to a process for the continuous manufacture of ethylene homopolymers or of copolymers of ethylene with up to 15 mole %, based on the ethylene, of α-monoolefins of 3 to 8 carbon atoms, by catalytically polymerizing the monomer or monomers at from 60° to 115° C. and at ethylene partial pressures of from 1 to 40 bars in an alkane hydrocarbon of 4 to 6 carbon atoms, which is liquid under the polymerization conditions and is a solvent for the monomer or monomers but a non-solvent for the polymer formed, the polymer being isolated by (a) discharging, from the polymerization chamber, a mixture essentially consisting of polymer, alkane hydrocarbon and monomer or monomers, (b) bringing the mixture from stage (a) to from 1.1 to 3 bars, and to from 20° to 120° C., to form a gaseous phase, essentially consisting of the monomer or monomers and alkane hydrocarbon, the constituents of which phase are recycled to the polymerization chamber, and a solid phase essentially consisting of polymer with from 0.1 to 8 percent by weight, based on the weight of the polymer, of alkane hydrocarbon adhering thereto, and (c) flushing the solid phase from stage (b) at from 1 to 2 bars, and at from 20° to 130° C., with an amount of inert gas which is from 1 to 30 times the amount by volume of the polymer, to form a solid phase consisting of substantially pure polymer, which is separated off as such, and a gaseous phase consisting essentially of alkane hydrocarbon and inert gas.

Processes of this type have been disclosed. They are in general referred to as "PF processes" (this being an abbreviation for particle-form processes); for example, their basic aspects are described in Austrian Pat. No. 222,349. A particular embodiment of the process which has proved of industrial value employs a loop-shaped reaction vessel and is described, for example, in German Pat. No. 1,520,461.

It is in the nature of the PF process that at an intermediate stage of their isolation, the polymers are in the form of particles to which small amounts of the alkane hydrocarbon serving as the polymerization medium still adhere; this constitutes the solid phase from stage (b). To remove this adhering alkane hydrocarbon, the polymers are flushed in a certain manner with an inert gas, resulting in a gaseous mixture consisting essentially of the alkane hydrocarbon and inert gas; this constitutes the gaseous phase from stage (c).

Since economical working up of this mixture, and hence the inherently desirable recovery of the individual components of the mixture, has hitherto not been possible, the said mixture is, in the conventional industrial embodiment of the PF process, discharged into the atmosphere, either as such or by burning the mixture; in either case, a problem of environmental pollution arises.

It is an object of the present invention to provide a PF process of the type defined above, by means of which it is possible economically to work up the gaseous mixture in question, namely the gaseous phase from stage (c), in such a way that the recovered individual components of the mixture are obtained in a directly reutilizable form, in particular in a form in which they can be directly utilized for the process itself.

We have found that this object is achieved if the components of the gaseous mixture in question are worked up by certain specific integrated liquefaction and evaporation processes, these being advantageously integrated into the process itself.

Accordingly, the present invention relates to a process for the continuous manufacture of ethylene homopolymers or of copolymers of ethylene with up to 15 mole %, based on the ethylene, of α-monoolefins of 3 to 8 carbon atoms, by catalytically polymerizing the monomer or monomers at from 60° to 115° C. and at ethylene partial pressures of from 1 to 40 bars in an alkane hydrocarbon of 4 to 6 carbon atoms, which is liquid under the polymerization conditions and is a solvent for the monomer or monomers but a non-solvent for the polymer formed, the polymer being isolated by (a) discharging, from the polymerization chamber, a mixture essentially consisting of polymer, alkane hydrocarbon and monomer or monomers, (b) bringing the mixture from stage (a) to from 1.1 to 3 bars, and to from 20° to 120° C., to form a gaseous phase, essentially consisting of the monomer or monomers or alkane hydrocarbon, the constituents of which phase are recycled to the polymerization chamber, and a solid phase essentially consisting of polymer with from 0.1 to 8 percent by weight, based on the weight of the polymer, of alkane hydrocarbon adhering thereto, and (c) flushing the solid phase from stage (b) at from 1 to 2 bars, and at from 20° to 130° C., with an amount of inert gas which is from 1 to 30 times the amount by volume of the polymer, to form a solid phase consisting of substantially pure polymer, which is separated off as such, and a gaseous phase consisting essentially of alkane hydrocarbon and inert gas, wherein, as additional measures (d) the gaseous phase from stage (c) is brought to from 1 to 40 bars, especially from 1.2 to 20 bars, and the temperature is lowered to the point that two phases form, namely a gaseous phase essentially consisting of inert gas, which can, if desired, advantageously be combined with the inert gas for stage (c), and a liquid phase essentially consisting of alkane hydrocarbon, and (e) the liquid phase from stage (d) is separated into two portions, by evaporating from 2 to 50, especially from 5 to 15, percent by volume of the liquid phase at from 1 to 3 bars to form the first portion, which, if desired, is advantageously combined with the gaseous phase from stage (c), and recycling the remaining amount of the liquid phase, as the second portion which may or may not be in the gaseous state in an intermediate stage, to the polymerization chamber.

In a preferred embodiment of the process of the invention, in stage (d), the amount of heat required to be removed in order to lower the temperature and effect condensation is abstracted by means of a heat exchanger of which the heat-absorbing medium is liquid, evaporating ethylene, which after evaporation is introduced into the polymerization chamber.

In a particular form of the said preferred embodiment of the process of the invention, the liquid ethylene which serves as the heat-absorbing medium is obtained from gaseous ethylene by means of a heat exchanger, of which the heat-absorbing medium is a liquid, evaporating alkane hydrocarbon, which after evaporation is introduced into the polymerization chamber.

In a further particular form of the said preferred embodiment of the process of the invention, the liquid ethylene which serves as the heat-absorbing medium is obtained from gaseous ethylene by means of a heat exchanger, of which the heat-absorbing medium is the liquid phase from stage (d).

For greater ease of visualizing the process according to the invention, reference may be made to the attached FIGS. 1 to 4, which are purely schematic, and in which, for simplification, exclusively the equipment and processes essential to the invention are shown.

Figure 1:
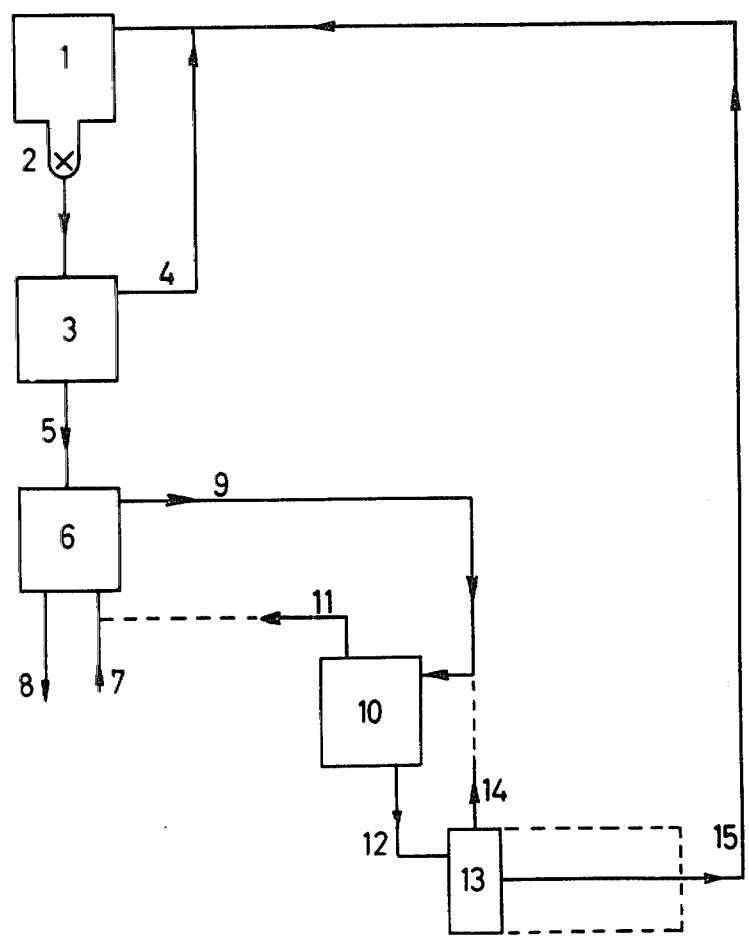
FIG. 1 shows the general embodiment of the process and hence the procedure as described in claim 1.

In the Figures, the numerals have the following meanings:

(1) Polymerization chamber
(2) Equipment for carrying out stage (a)
(3) Equipment for carrying out stage (b)
(4) Exit of the gaseous phase from stage (b)
(5) Exit of the solid phase from stage (b)
(6) Equipment for carrying out stage (c)
(7) Entry of the inert gas into stage (c)
(8) Exit of the solid phase from stage (c)
(9) Exit of the gaseous phase from stage (c)
(10) Equipment for carrying out stage (d)
(11) Exit of the gaseous phase from stage (d)
(12) Exit of the liquid phase from stage (d)
(13) Equipment for carrying out stage (e)
(14) Exit of the first portion from stage (e)
(15) Exit of the second portion from stage (e)
(16) Entry of the liquid ethylene into stage (d), as in claim 2
(17) Exit of the gaseous ethylene from stage (d), as in claim 2
(18) Entry of the gaseous ethylene, as in claim 3
(19) Exit of the liquid ethylene, as in claim 3
(20) Entry of the liquid alkane hydrocarbon, as in claim 3
(21) Exit of the gaseous alkane hydrocarbon, as in claim 3
(22) Entry of the gaseous ethylene, as in claim 4
(23) Exit of the liquid ethylene, as in claim 4.

Carrying out the process of the invention does not entail any difficulties for those skilled in the art, as may be seen from the following:

The materials to be employed in the process are the relevant conventional materials. This applies to the monomers, especially ethylene, and to the comonomers which may or may not be present, eg. propene, 1-butene, i-butene or 1-hexene. The same is true of the alkane hydrocarbon, which may in particular be n-butane, i-butane, i-pentane or n-pentane, or also cyclohexane—and also of the catalysts which as a rule are of the Phillips type (in most cases chromium trioxide on a silicate carrier) or of the Ziegler type (in most cases a halogen-containing titanium compound plus an alkyl-containing aluminum compound). The same is true of the inert gas used for flushing in stage (c), which is preferably nitrogen.

The equipment required for the process, such as polymerization reactors, entry and exit devices, pressure-reducing valves (let-down valves), let-down vessels, dryers, flushing equipment, pumps and compressors for increasing the pressure and conveying the medium, condensers and evaporators again exhibit no peculiarities in themselves and are to be found in the prior art.

Summarizing, the process—except for the part which is according to the invention—has for a number of years not only been known from the literature but also been practised industrially, so that to this extent further comments are superfluous.

With regard to the part of the novel process which is according to the invention, the following details may be noted:

In stage (d), the gaseous phase from stage (c) is brought to a certain pressure and the temperature is lowered to the point that two phases form, namely a gaseous phase essentially consisting of inert gas (which, if desired, is combined with the inert gas for stage (c), it being advantageous to do so) and a liquid phase essentially consisting of alkane hydrocarbon.

Figure 2:
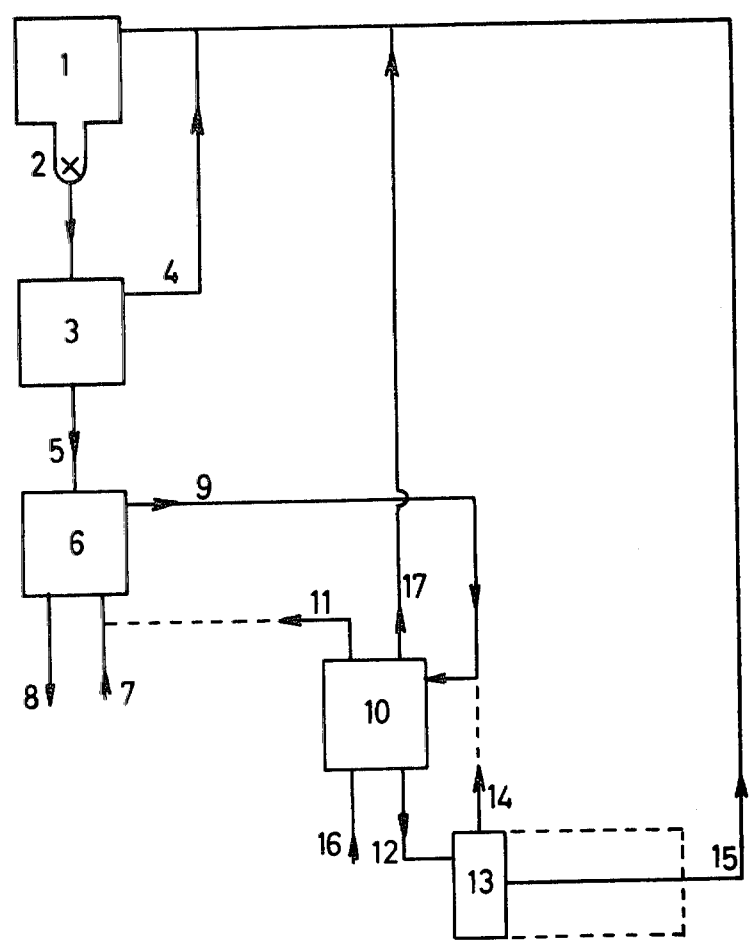
FIG. 2 represents the preferred embodiment of the process and hence the procedure as described in claim 2.

We have found that as a rule it is advantageous to carry out the process in such a way that the pressure in stage (d) is higher than in stage (c), i.e. in general the gaseous phase from stage (c) is compressed in order to carry out stage (d). Since, on the other hand, the pressure to be set up in stage (d) can be the lower, the lower is the temperature to be selected (as shown by the phase diagram of the alkane hydrocarbon), it has proved advantageous (cf. FIG. 2) if, in stage (d), the amount of heat required to be removed in order to lower the temperature and effect condensation is abstracted by means of a heat exchanger of which the heat-absorbing medium is liquid, evaporating ethylene (which, after evaporation, is introduced into the polymerization chamber). Liquid ethylene is in many cases available as such from ethylene chemistry processes and can, on evaporation, easily reach a temperature of, for example, $-70°$ C., i.e. an attractively low temperature, so that it is unnecessary to use special refrigeration equipment and/or cooling media which are not part of the process. If liquid ethylene is not directly available, it can be obtained in a simple and advantageous manner as an integral constituent of the process according to the invention (cf. FIG. 3) by producing it from gaseous ethylene by means of a heat exchanger of which the heat-absorbing medium is a liquid, evaporating alkane hydrocarbon, i.e. once again a cooling medium which forms part of the process (and which, after evaporation, is introduced into the polymerization chamber). The liquid alkane hydrocarbon which serves as the heat-absorbing medium can advantageously be the liquid phase from stage (d) (cf. FIG. 4).

Finally it should be noted, with regard to stage (d), that by discharging small amounts of the gaseous phase leaving the said stage, provided this phase is combined with the inert gas for stage (c) (cf. item (11) in all of FIGS. 1 to 4) it is possible to prevent the accumulation of foreign gas contaminants, e.g. oxygen, in the system.

In stage (e), the liquid phase from stage (d) is separated into two portions, by evaporating a certain amount of the liquid phase at a particular pressure to form a first portion (which, if desired, is combined with the gaseous phase from stage (c), it being advantageous to do so), and recycling the remaining amount of the liquid phase, as a second portion, which may or may not be in the gaseous state in an intermediate stage, to the polymerization chamber.

Stage (e) primarily serves to ensure that the recovered alkane hydrocarbon, which is to be recycled to the polymerization chamber, is in the pure state, principally in the sense that neither inert gas nor contaminant foreign gases which have an adverse effect on the polymerization, in particular oxygen, are carried with the alkane hydrocarbon. For this purpose, a part of the liquid phase coming from stage (d) is evaporated in stage (e), and as a result the undesirable gases are driven off with it.

The remaining liquid part of the alkane hydrocarbon, which has been freed from undesirable gases, is either directly recycled in the liquid state to the polymerization chamber or is evaporated in an intermediate stage and is only then recycled to the polymerization chamber. The last-mentioned procedure will be followed particularly if it is desired to utilize directly the negative heat potential of the liquid alkane hydrocarbon, e.g. for liquefying gaseous ethylene, as is explained in more detail in connection with stage (d) (compare also FIG. 4). Since, in the case of such use, the liquid alkane hydrocarbon is as a rule evaporated completely, any high-boiling foreign materials which may be present can also be discharged from the system, as the evaporation residue.

The evaporators conventionally used for distillation can be employed for carrying out stage (e). Advantageously, they are either equipped so that the liquid phase coming from stage (d) is evaporated partially (the evaporated part constituting the first portion) whilst the rest remains liquid (this remainder being the second portion), or equipped so that the liquid phase coming from stage (d) is evaporated completely, with the first and second evaporated portions being discharged separately. In the former case, partial evaporators may be used, for example an apparatus in the form of a horizontal jacketed tube evaporator. In the latter case, such partial evaporators may again be used, but are followed downstream by a further evaporation zone or a further evaporator, which may again be a jacketed tube evaporator. It is also possible to use evaporators which act as a column, with separate discharge devices for the first and second evaporated portions, and with or without a separate discharge device for the evaporation residue, consisting of high-boiling foreign materials, which in general accumulates in the bottom of the evaporator.

EXAMPLE

The process uses a conventional reactor for the continuous polymerization of ethylene, in which the reaction chamber consists of a loop, having a capacity of 25 m$^3$. During the continuous polymerization, the reaction chamber is filled with a 33 percent strength by weight suspension of polyethylene in i-butane (which is a solvent for ethylene but a non-solvent for polyethylene), which is circulated sufficiently rapidly by a propeller pump for the flow to be turbulent. The temperature in the reactor is maintained at 105° C. During the continuous polymerization, 200 g per hour of a conventional catalyst for the polymerization of ethylene, comprising chromium trioxide on a silicate carrier, are introduced, and the ethylene partial pressure is maintained at 25 bars.

Figure 3:
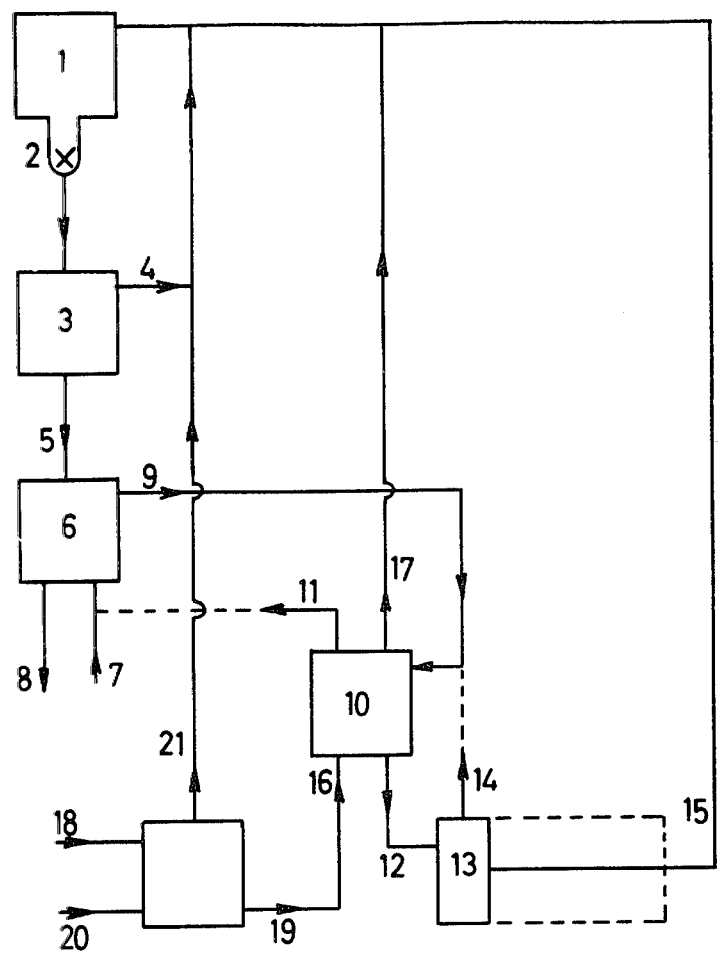
FIG. 3 shows the first particular form of the preferred embodiment of the process, and hence the procedure as described in claim 3.
Figure 4:
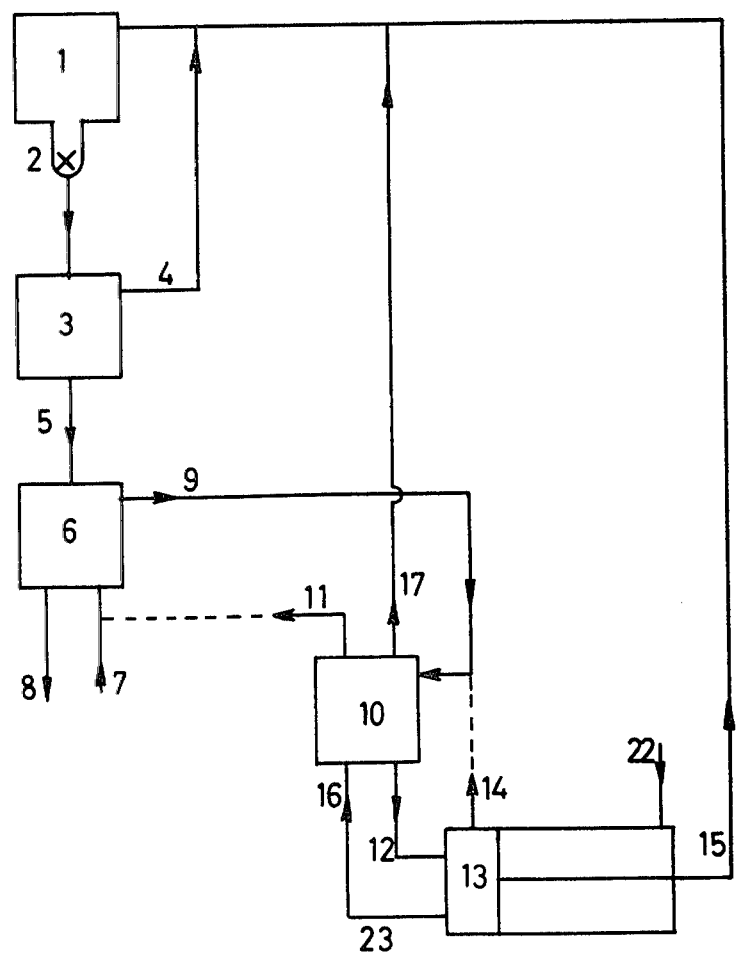
FIG. 4 shows the second particular form of the preferred embodiment of the process, and hence the procedure as described in claim 4.

The polymer is isolated—compare FIG. 3—by (a) discharging from the polymerization chamber a mixture consisting essentially of polymer, i-butane and ethylene (about 5,000 kg/hour of mixture, composed of about 3,000 kg of polyethylene, about 1,800 kg of i-butane and about 200 kg of ethylene), (b) bringing the mixture from stage (a), by letting-down, to 1.5 bars, and to 90° C., so as to form ($b_1$) a gaseous phase consisting essentially of ethylene and i-butane, the constituents of this phase being recycled to the polymerization chamber, and ($b_2$) a solid phase essentially consisting of polymer with 3 percent by weight of i-butane, based on the weight of the polymer, adhering thereto, and (c) flushing the solid phase ($b_2$) from stage (b), at 1.1 bars, at 110° C., with an amount of nitrogen equal to 8 times the amount by volume of the polymer, to form ($c_1$) a solid phase which consists of substantially pure polymer and is separated off as such, and ($c_2$) a gaseous phase which consists essentially of i-butane and nitrogen.

The procedure which is then followed, and which characterizes the process of the invention, is that, in addition (d) the gaseous phase ($c_2$) from stage (c) is brought to 5 bars, by compression, and the temperature is lowered sufficiently (namely to $-60°$ C.) in a condenser, that two phases form, namely ($d_1$) a gaseous phase which consists essentially of nitrogen and which, after discharging 5% by volume thereof) is combined with the nitrogen for stage (c), and ($d_2$) a liquid phase essentially consisting of i-butane, and (e) the liquid phase ($d_2$) from stage (d) is separated into two portions, so that ($e_1$) 8 percent by volume of the liquid phase are evaporated in an evaporator whilst being let down to 1.6 bars, to form the first portion, which is combined with the gaseous phase from stage (c), and ($e_2$) the remaining amount of the liquid phase (about 90 kg/hour), which constitutes the second portion, is recycled to the polymerization chamber after being present, in an intermediate stage, in the gaseous state (resulting from the second portion also being evaporated in an evaporator at 1.6 bars).

Specifically, in this procedure, the amount of heat required to be removed in order to lower the temperature and effect condensation is abstracted, in stage (d), by means of a condenser (heat exchanger) of which the heat-absorbing medium is liquid, evaporating ethylene, which after evaporation is introduced into the polymerization chamber. The liquid ethylene which serves as the heat-absorbing medium is in turn obtained from gaseous ethylene, which is at 60 bars, by means of a condenser (heat exchanger), of which the heat-absorbing medium is liquid, evaporating i-butane which, after evaporation, is introduced into the polymerization chamber.

I claim:

1. In a process for the continuous manufacture of ethylene homopolymers or of copolymers of ethylene with up to 15 mole %, based on the ethylene, of α-monoolefins of 3 to 8 carbon atoms, by catalytically polymerizing the monomer or monomers at from 60° to 115° C. and at ethylene partial pressures of from 1 to 40 bars in an alkane hydrocarbon of 4 to 6 carbon atoms, which is liquid under the polymerization conditions and is a solvent for the monomer or monomers but a non-solvent for the polymer formed, the polymer being isolated by (a) discharging, from the polymerization chamber, a mixture essentially consisting of polymer, alkane hydrocarbon and monomer or monomers, (b) bringing the mixture from stage (a) to from 1.1 to 3 bars and to from 20° to 120° C., to form a gaseous phase, essentially consisting of the monomer or monomers and alkane hydrocarbon, the constituents of which phase are recycled to the polymerization chamber, and a solid phase essentially consisting of polymer with from 0.1 to 8 percent by weight, based on the weight of the polymer, of alkane hydrocarbon adhering thereto, and (c) flushing the solid phase from stage (b) at from 1 to 2 bars, and at from 20° to 130° C., with an amount of nitrogen which is from 1 to 30 times the amount by volume of the polymer, to form a solid phase consisting of substantially pure polymer, which is separated off as such, and a gaseous phase consisting essentially of alkane hydrocarbon and nitrogen, the improvement comprising:

(d) adjusting the gaseous phase from stage (c) to from 1.1 to 40 bars above atmospheric pressure and lowering the temperature to the point that two phases form, namely a gaseous phase essentially consisting of nitrogen, which can, if desired, be combined with the nitrogen for stage (c), and a liquid phase essentially consisting of alkane hydrocarbon, and (e) separating the liquid phase from stage (d) into two portions, by evaporating from 2 to 50 percent by volume of the liquid phase at from 1 to 3 bars to form the first portion, which is combined with the gaseous phase from stage (c), and recycling the remaining amount of the liquid phase, as the second portion which may or may not be in the gaseous state in an intermediate stage, to the polymerization chamber.

2. The process of claim 1, wherein, in stage (d), the amount of heat required to be removed in order to lower the temperature and effect condensation is abstracted by means of a heat exchanger of which the heat-absorbing medium is liquid, evaporating ethylene, which after evaporation is introduced into the polymerization chamber.

3. The process of claim 2, wherein the liquid ethylene which serves as the heat-absorbing medium is obtained from gaseous ethylene by means of a heat exchanger, of which the heat-absorbing medium is a liquid, evaporating alkane hydrocarbon, which after evaporation is introduced into the polymerization chamber.

4. The process of claim 2, wherein the liquid ethylene which serves as the heat-absorbing medium is obtained from gaseous ethylene by means of a heat exchanger, of which the heat-absorbing medium is the liquid phase from stage (d).

* * * * *